United States Patent [19]

Svazas et al.

[11] Patent Number: 4,723,095
[45] Date of Patent: Feb. 2, 1988

[54] DAYTIME RUNNING LIGHTS USING TURN SIGNAL LAMPS

[75] Inventors: Raymond Svazas, St. Catharines; Kenneth R. Macintyre, Oakville, both of Canada

[73] Assignee: Dominion Automotive Industries Inc., Toronto, Canada

[21] Appl. No.: 24,167

[22] Filed: Mar. 10, 1987

[51] Int. Cl.[4] ............................................. B60Q 1/02
[52] U.S. Cl. ...................................... 315/82; 315/77; 315/83; 307/10 LS
[58] Field of Search ................ 315/77, 82; 307/10 LS

[56] References Cited

U.S. PATENT DOCUMENTS 3,337,846 8/1967 Hollins .................................. 315/82
3,397,342 8/1968 Dill ........................................ 315/77

*Primary Examiner*—Harold Dixon
*Attorney, Agent, or Firm*—Sim & McBurney

[57] ABSTRACT

A system of daylight running lights utilizing the front turn signal lights of a vehicle incorporates a solenoid coil and a double pole single throw switch, such that when the coil is activated, both poles are closed. A connection from the ignition circuit to the coil is such that when the ignition circuit is at "run", power is available to said coil. The circuit is such as to prevent the coil from being grounded, thus de-activating the coil, whenever the turn signal switch is on, or whenever the headlight switch is on. When either of these conditions applies, the DPST switch is open. The coil is grounded and thus activated whenever the turn signal switch and the headlight switch are both off. The circuit is such that power can be fed through the DPST switch, when closed, to energize both signal lights simultaneously, thus providing daytime running lights.

3 Claims, 1 Drawing Figure

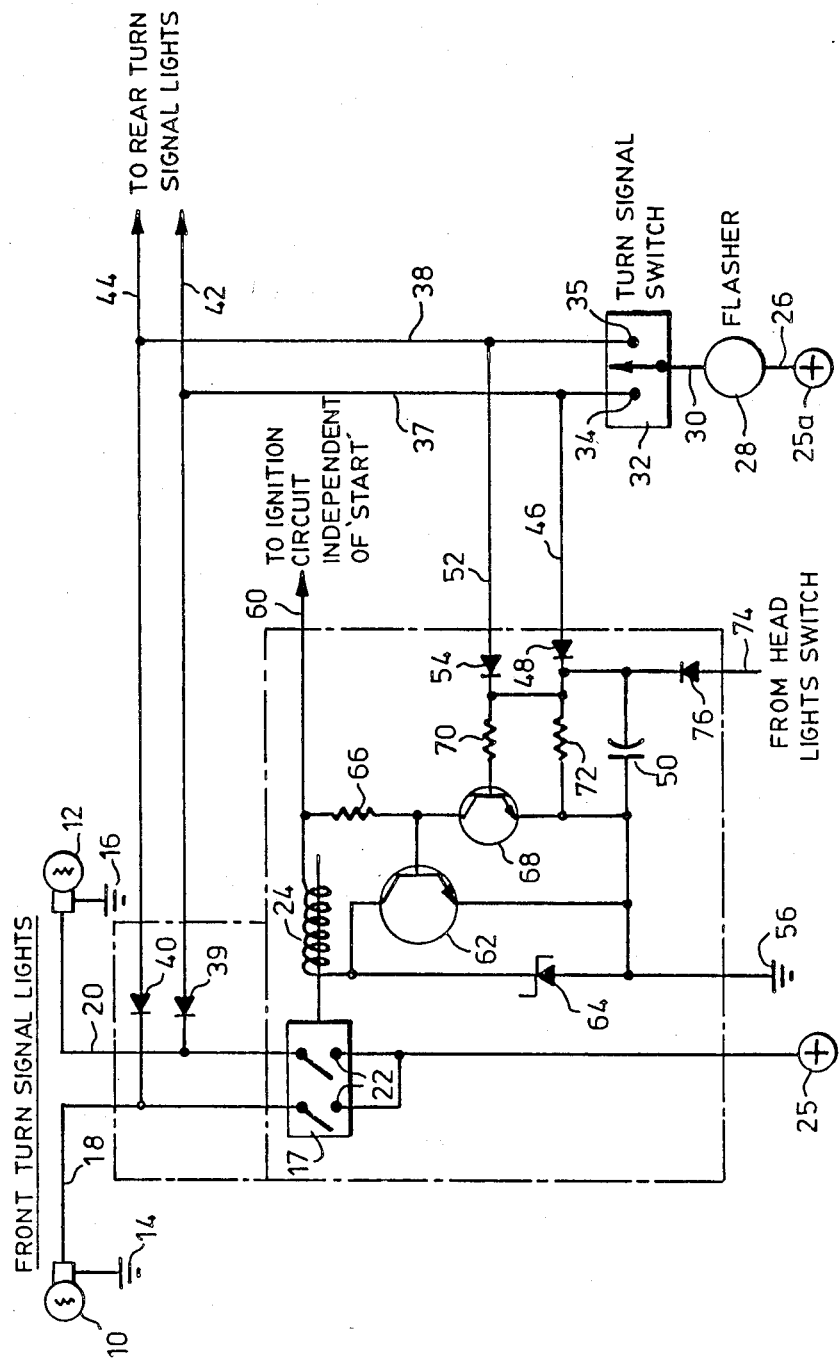

DAYTIME RUNNING LIGHTS USING TURN SIGNAL LAMPS

This invention relates generally to automotive headlamp arrangements, and has to do particularly with an arrangement for allowing low-intensity daytime running lights on a vehicle, utilizing existing or standard electrical components.

BACKGROUND OF THIS INVENTION

Some American states and some Canadian provinces have made it mandatory, or are considering making it mandatory at the present time, for all automobiles to have daylight running lights that are always on whenever the car is in operation. Various proposals have been made for accomplishing this, including the provision of separate daytime running lights, completely independent from the normal nighttime headlamps. Another proposal is simply to include a resistance in the circuit feeding the normal headlights, such that the resistance may be inserted during the daytime, and removed at night when brighter headlights are required.

Both of these prior proposals are expensive, the first because it requires the provision of an entirely separate set of lights, the second because it requires the provision of a resistance, and also the energy wasted in heat through the resistance.

It has also been proposed that the normal or standard headlamps of a car, which are normally connected to the battery in parallel for nighttime operation, be capable of connection in series during the daytime, so that each headlamp will "see" only half of the voltage provided. This will considerably reduce the brightness of each headlamp, and will not seriously decrease the life of the filament being utilized for the daytime lights.

Of particular interest in this connection is U.S. Pat. No. 1,130,969, issued Mar. 9, 1915 to A. H. Fleet. Another patent which describes a circuit for a series or parallel connection of headlamps is U.S. Pat. No. 1,112,903, issued Oct. 6, 1914 to H. H. Ham. Still another patent directed to this same concept is U.S. Pat. No. 1,257,618, issued Feb. 26, 1918 to D. F. Leone. Yet another patent pertinent in this regard is U.S. Pat. No. 1,313,583, issued Aug. 19, 1919 to W. Curtis.

Other patents of more general interest are the following:

U.S. Pat. No. 3,040,207, issued June 19, 1962 to Grontkowski.

U.S. Pat. No. 3,244,934, issued Apr. 5, 1966 to G. L. Webb.

U.S. Pat. No. 3,277,442, issued Oct. 4, 1966 to W. R. Kearney. This patent places a light-sensitive resistor in the circuit of the warning lamps, thereby varying the amount of current flowing through the lamps.

The first four patents described above, all of which disclose the optional series-connection of headlamps for daytime running, require the operator to learn a new procedure, namely to remember to turn on the daytime running lamps when the vehicle is being operated during the day. Many drivers have been operating their vehicles for decades, and would find it difficult to remember unfailingly to turn on daytime running lights using a manual switch, assuming one were provided.

A companion patent application has been filed in Canada, on Sept. 10, 1985, Ser. No. 490,332, which provides a method and apparatus by which daytime running lights may automatically be switched on whenever the automobile is in operation, the circuitry being such that two headlamps are connected in parallel across the battery terminals for normal nighttime operation, but are connected in series across the battery terminals during the day whenever the car is running. This provides a "fail-safe" method which does not require the operator to learn a new operational procedure, or always to remember to do something which he does not normally do.

While the invention of the said Canadian Patent application Ser. No. 490,332 provides a very satisfactory solution to the problem, there are situations in which it would be of advantage not to use the headlamps to provide daytime running lights, but rather to use the signal lights at the front end of the vehicle to provide daytime running lights.

Again, however, it is desirable to have a system which operates automatically, not requiring the operator to remember a new operational procedure, or to perform some task which he does not normally perform.

GENERAL DESCRIPTION OF THIS INVENTION

A general aim of an aspect of this invention is to provide a daytime running light system for a vehicle, utilizing turn signal lamps.

More particularly, this invention provides, in a vehicle having two front turn signal lights, a source of electrical power, a turn signal switch in series with a flasher connected to said source, and an ignition circuit, a daytime running light system comprising:

a relay in which a solenoid coil controls a double pole single throw (DPST) switch such that when the coil is activated, both poles are closed, a connection from the ignition circuit to said coil such that when the ignition circuit is in the "run" position, power is available to said coil, first means which prevents the coil from being grounded whenever (a) the turn signal switch is on, or (b) the headlight switch is on, whereby the DPST switch is open, and which allows the coil to be grounded when the turn signal switch and the headlight switch are both off, and second means by which power can be fed through said DPST switch, when closed, to energize both signal lights simultaneously.

GENERAL DESCRIPTION OF THE DRAWING

The single FIGURE of the drawing is a schematic circuit diagram showing an embodiment of this invention.

DETAILED DESCRIPTION OF THE DRAWING

In the drawing, a left turn signal light 10 and a right turn signal light 12 are grounded at 14 and 16 respectively, and each has a second terminal connected to the wires 18 and 20, respectively. The wires 18 and 20 are connected to a double pole single throw switch 17 having two terminals 22 joined together and connected to the positive pole 25 of the vehicle battery. The internal contacts of the switch 17 move together in tandem, and are operated by a solenoid coil 24. When the solenoid coil 24 is energized, the internal contacts of the switch 17 close, connecting the wires 18 and 20 directly through to the pole 25 of the battery. When the coil 24 is de-energized, the two contacts of the switch 17 open, thus isolating the wires 18 and 20 from the pole 25 and from each other.

At the right in the FIGURE is another battery pole 25a. Although this pole is shown to be different, in fact both 25 and 25a represent the positive pole of the vehicle battery. From the pole 25a, a line 26 leads to a flasher 28, and from the flasher 28 a line 30 leads to the turn signal switch 32. The turn signal switch 32 has three positions: a "no flash" position where neither of two contacts 34 and 35 are powered (this is the condition in which the switch 32 is shown in the FIGURE), a second position in which the contact 34 receives power from the pole 25a, and a third position in which the contact 35 receives power from the pole 25a. The contact 34 is connected to a wire 37 which delivers power through a diode 39 to the line 20 which activates the right turn signal light 12. The other contact 35 delivers power through a diode 40 to the line 18, thus activating the left turn signal light 10. As can be seen at the upper right in the FIGURE, the lines 37 and 38 also deliver power through lines 42 and 44, respectively, which run to the rear turn signal lights (not shown).

Further, a line 46 connected to the line 37 delivers power through a diode 48 to the right side of a capacitor 50. A line 52 connected to the line 38 delivers power through another diode 54, also to the right side of the capacitor 50. The left side of the capacitor 50 is grounded at 56. A wire 60 is connected to the ignition circuit so that, whenever the key has been inserted and is turned to the "run" position, power from the positive pole of the battery is available along the line 60. Power is not available when the key is turned to "start", in order to avoid drain on the battery which might interfere with the high power requirement for starting the engine. The line 60 is connected to one end of the solenoid coil 24, the other end of which is connected to the collector of a transistor 62. The emitter of the transistor 62 is connected to the ground 56. A Zener diode 64 is connected in parallel with the collector and emitter of the transistor 62, for the purpose of reducing voltage surges in the circuit and thus improving the life of the components. The base of the transistor 62 is connected to the line 60 through a resistance 66, and connected between the base of the transistor 62 and the ground 56 is a second transistor 68. Specifically, the collector of the transistor 68 is connected to the base of the transistor 62, while the emitter of the transistor 68 is connected to the ground 56, and also connected to the left side of the capacitor 50. The capacitor 50 is connected between the base of the transistor 68 and the ground 56 through a resistance 70. A further resistance 72, larger than the resistance 70, is connected between the two sides of the capacitor 50.

A line 74 from the headlight switch brings power to the right side of the capacitor 50 through a diode 76, whenever the headlight switch is turned "on".

Generally speaking, the nature of this circuit is such that the switch 17 is closed during the daytime when (a) the main headlights are not on, (b) the turn signal switch is not activated, and (c) the ignition switch is on "run". So long as all of these conditions apply, power from the ignition circuit reaches the solenoid coil 24 and is grounded through the transistor 62 at the ground 56. However, when either the headlight switch is turned on or the turn signal switch is activated, the circuit is such that the solenoid coil 24 is de-activated because the transistor 62 becomes non-conducting. This allows the switch 17 to open, which permits the turn signals to operate in the normal manner.

A more specific description of the operation of the circuit now follows.

Ignition on to "run"

Power from the ignition circuit surges along line 60 to the solenoid coil 24, but cannot pass unless the transistor 62 or the Z-diode 64 are conducting. The Z-diode 64 normally does not conduct, and is assumed to be non-conducting for all functions. Power from the ignition circuit also passes through the resistor 66 and branches out to the base of the transistor 62 and the collector of the transistor 68. In this condition, the transistor 68 is not conducting, as nothing has yet happened to place a charge across the capacitor 50. Therefore, the control voltage builds up to activate the transistor 62, making it conductive and allowing activation of the solenoid coil 24 to close the switch 17. This turns both front turn signal lights on, to act as the daytime running lights. The diodes 39 and 40 do not permit power to reach the rear turn signal lights.

Ignition key in "start" position

Power from the ignition circuit is interrupted and does not flow along line 60. Therefore, the coil 24 is de-activated, relay 17 opens, and power cannot pass through 17 to the signal lights 10 and 12. The daylight running lights are then off.

Ignition on to "run" and headlights turned on

Continuous power is available along line 74 through the diode 76 to the capacitor 50. A trickle of power passes through the resistor 72, which may be rated in the region of 10 K-ohms. Full voltage is also available at the resistor 70, which may be rated about 1 K-ohm. This power passes through resistor 70 and activates transistor 68 to be conductive. With the transistor 68 conductive, power is taken away from the base of the transistor 62 through the transistor 68 to the ground 56. This causes transistor 62 to become non-conducting, thus blocking current from passing through the coil 24. With the coil 24 de-activated, relay 17 springs back to its normally open position, which interrupts power from pole 25, whereupon the lights 10 and 12 go off. Thus, the daylight running lights are off under this condition.

Ignition key at "run" and turn signals turned on (left or right)

Intermittent power from the flasher 28 passes through the signal switch 32 and either diode 48 or 54 to instantaneously charge capacitor 50. This capacitor accumulates enough charge to maintain adequate voltage to the base of the transistor 68 for a period of time exceeding the flasher "off" time. The amount of charge bled off the capacitor through resistor 72, and thus the voltage decay at the base of transistor 68, is adjusted by sizing the capacitor 50 and the resistance 72. These values are adjusted so that the capacitor 50 maintains a "holding" control voltage on the base of the transistor 68, thus allowing the transistor 68 to continuously conduct, even though the power supply from the signal switch is intermittent. This causes the transistor 62 to be non-conducting, which de-activates the coil 24, which allows the switch 17 to move to its open position, thus cutting current between pole 25 and the signal lights 10 and 12. However, through the lines 37 and 38, power from the turn signal switch 32 reaches one or the other of the signal lights 10 and 12, to operate them in the normal fashion.

Turn signals or headlights turned off

The built-up charge in the capacitor 50 is allowed to decay to the ground 56 through the resistor 72. The time to decay and allow transistor 68 to become non-conducting should not exceed two seconds. When the transistor 68 is de-energized, this allows voltage to build up on the base of transistor 62, which becomes conducting and allows current to pass through the coil 24, thus activating the relay 17 and turning the daylight running lights on again.

Ignition turned "off"

Power from the ignition circuit no longer is available along the line 60, which de-energizes the coil 24. The relay 17 springs to its normally open position, which prevents power from 25 reaching the lights 10 and 12. The daylight running lights are then off.

While one embodiment of this invention has been illustrated in the accompanying drawing, and described hereinabove, it will be evident to those skilled in the art that changes and modifications may be made therein, without departing from the essence of this invention, as set forth in the appended claims.

The embodiments of the invention in which an exclusive property or privilege is claimed are defined as follows:

1. In a vehicle having two front turn signal lights, a source of electrical power, a turn signal switch in series with a flasher connected to said source, and an ignition circuit, a daytime running light system comprising:
   a relay in which a solenoid coil controls a double pole single throw (DPST) switch such that when the coil is activated, both poles are closed,
   a connection from the ignition circuit to said coil such that when the ignition circuit is in the "run" position, power is available to said coil,
   first means which prevents the coil from being activated whenever
   (a) the turn signal switch is on, or
   (b) the headlight switch is on, whereby the DPST switch is open, and which allows the coil to be activated when the turn signal switch and the headlight switch are both off,
   said first means comprising:
   a first transistor connected so that, when it is conducting, the coil is grounded through the collector and emitter of the first transistor,
   a second transistor connected to control the base of the first transistor such that, when the second transistor is conducting, the first transistor is non-conducting and the coil is de-activated to open the DPST switch,
   and further means by which the turning on of either the turn signal switch or the head light switch causes the second transistor to be conducting,
   and second means by which power can be fed through said DPST switch, when closed, to energize both signal lights simultaneously.

2. The invention as claimed in claim 1, in which the vehicle also has two rear signal lights, the system further comprising third means preventing power delivered through the DPST switch from passing to and energizing the rear signal lights.

3. The invention claimed in claim 1, in which said further means comprises:
   a first line from the left turn signal activating line through a first diode to one side of a capacitor of which the other side is grounded, the first diode being connected to allow conventional current to flow to the capacitor,
   a second line from the right turn signal activating line through a second diode to said one side of said capacitor, the second diode being connected to allow conventional current to flow to the capacitor,
   a third line from the headlight switch through a third diode to said one side of said capacitor, the third diode being connected to allow conventional current to flow to the capacitor,
   the capacitor being connected so that said one side thereof is connected to the base of the second transistor through a first resistance and is connected to the emmiter of said second transistor through a second resistance.

* * * * *